(12) United States Patent
Han et al.

(10) Patent No.: US 11,582,181 B2
(45) Date of Patent: *Feb. 14, 2023

(54) GROUP CHAT INITIATING METHOD ON BASIS OF SHARED DOCUMENT, DEVICE AND APPARATUS THEREFOR, AND STORAGE MEDIUM

(71) Applicant: BEIJING BYTEDANCE NETWORK TECHNOLOGY CO., LTD., Beijing (CN)

(72) Inventors: Xiaowei Han, Beijing (CN); Kun Wang, Beijing (CN); Weimin Shen, Beijing (CN); Jinlei Chen, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/349,798

(22) Filed: Jun. 16, 2021

(65) Prior Publication Data

US 2021/0314285 A1 Oct. 7, 2021

Related U.S. Application Data

(63) Continuation of application No. 17/017,581, filed on Sep. 10, 2020, now Pat. No. 11,070,505, which is a (Continued)

(30) Foreign Application Priority Data

Jun. 29, 2018 (CN) .......................... 201810718747.9

(51) Int. Cl.
H04L 51/08 (2022.01)
H04L 51/42 (2022.01)
G06F 3/0482 (2013.01)

(52) U.S. Cl.
CPC .............. H04L 51/42 (2022.05); H04L 51/08 (2013.01); G06F 3/0482 (2013.01)

(58) Field of Classification Search
CPC ........ H04L 51/22; H04L 51/08; H04L 51/32; H04L 51/04; H04L 51/046; H04L 65/4015; G06F 3/048
See application file for complete search history.

(56) References Cited

U.S. PATENT DOCUMENTS 8,108,464 B1 1/2012 Rochelle et al.
8,832,212 B1 9/2014 Shah
(Continued)

FOREIGN PATENT DOCUMENTS

CN 1867109 A 11/2006
CN 101652788 A 2/2010
(Continued)

Primary Examiner — Dino Kujundzic
(74) Attorney, Agent, or Firm — Seed IP Law Group LLP

(57) ABSTRACT

Disclosed is a chat initiating method, comprising: determining a first user account that accesses a shared document; obtaining a first identifier of a chat group inserted into the shared document; displaying, according to a state of whether the first user account has joint into the chat group, a group chat control corresponding to the state in the shared document, wherein the group chat control is used for joining the chat group or for displaying an interface of the chat group; and sending, in response to an operation on the group chat control, a corresponding group chat request.

14 Claims, 9 Drawing Sheets

Related U.S. Application Data continuation of application No. PCT/CN2018/113509, filed on Nov. 1, 2018.

(56) References Cited

U.S. PATENT DOCUMENTS

| | | |
|---|---|---|
| 9,584,565 B1 | 2/2017 | Ho et al. |
| 2002/0075306 A1* | 6/2002 | Thompson ........ H04M 3/42374 715/753 |
| 2003/0225836 A1 | 12/2003 | Lee et al. |
| 2005/0004982 A1* | 1/2005 | Vernon ................ H04L 65/403 709/204 |
| 2009/0144386 A1 | 6/2009 | Hind et al. |
| 2010/0005142 A1 | 1/2010 | Xiao et al. |
| 2012/0110094 A1 | 5/2012 | Kwong |
| 2012/0209906 A1 | 8/2012 | Ausfeld |
| 2012/0331067 A1 | 12/2012 | Richter et al. |
| 2013/0046830 A1 | 2/2013 | MacDonald |
| 2013/0318447 A1 | 11/2013 | DeLuca et al. |
| 2016/0043974 A1 | 2/2016 | Purcell et al. |
| 2016/0259508 A1 | 9/2016 | Eccleston et al. |
| 2017/0019484 A1 | 1/2017 | Koum et al. |
| 2017/0147547 A1 | 5/2017 | Desai et al. |
| 2018/0041457 A1 | 2/2018 | Piira et al. |
| 2018/0103074 A1* | 4/2018 | Rosenberg ............ H04L 65/403 |
| 2018/0253215 A1 | 9/2018 | Powell |
| 2019/0190876 A1 | 6/2019 | Weinhold et al. |
| 2019/0205772 A1 | 7/2019 | Kohlmeier et al. |
| 2019/0361580 A1 | 11/2019 | Dowling et al. |

FOREIGN PATENT DOCUMENTS

| | | |
|---|---|---|
| CN | 102387093 A | 3/2012 |
| CN | 103780684 A | 5/2014 |
| CN | 103914859 A | 7/2014 |
| CN | 104980339 A | 10/2015 |
| CN | 105447162 A | 3/2016 |
| CN | 105827509 A | 8/2016 |
| CN | 107027327 A | 8/2017 |
| CN | 107566546 A | 1/2018 |
| CN | 107864190 A | 3/2018 |
| CN | 107920019 A | 4/2018 |
| CN | 108111401 A | 6/2018 |
| CN | 108182289 A | 6/2018 |
| WO | WO 2006047720 A2 | 5/2006 |
| WO | WO 2006047720 A3 | 5/2006 |
| WO | WO 2011035549 A1 | 3/2011 |
| WO | WO 2018065556 A1 | 4/2018 |
| WO | WO 2018085122 A1 | 5/2018 |

* cited by examiner

FIG. 2

Job Interview Record

Interviewee

On June 12, 2017, I interviewed ▓▓▓ who worked at ▓▓▓ for three years and is currently engaged in marketing brand work in the company.

On August 16, 2017, I interviewed ▓▓▓ who worked at ▓▓▓ for two years (from 2010 to 2012), then at a domestic ▓▓▓ and now is starting a business. The following content synthesizes the communication content of the two and summarizes it together.

Conference

Prior to the Conference

▓▓▓'s problem is there must be a clear goal for a meeting. The meeting does not have to have an agenda, but a plan. If there is no plan, it becomes a wrangling meeting. The person who organizes the meeting must bring the plan, not the question. ▓▓▓ requires that the meeting materials must be written down. By writing them down, i.e. "writing them on the paper", the above basic concept will be implemented (because you can't write casually).

The meeting organizer has to do a lot of work before the meeting and needs to prepare the content of the meeting in advance. Except for important meetings, PPT is never used in the meetings (▓▓▓ thinks that PPT is a waste of time). The content is mainly prepared in word format, and is controlled within 2-6 pages. The annual plan can be no more than 6 pages, usually no more than 2 pages, where the first two pages are detailed instructions, and the next 4 pages are Q&A. The content must be a complete sentence, and uses no list basically, because ▓▓▓ thinks that the information expressed by the list is not complete enough, is easy to be a noun, which is not rigorous, and usually contains lots of data. Preparing these contents is very brain-intensive, very difficult, and very painful at first. (Note: The two interviewees expressed different lengths of content.)

Print it out before the meeting and send it to everyone at the meeting. Print it with double-sided printing. Printing is indeed a waste of paper, but when it is printed, employees do not need to bring notebooks, and they are not allowed to bring notebooks, so they can focus on the meetings.

Conference in Process

Conference

▓▓▓ Initiating a conversation

GROUP CHAT INITIATING METHOD ON BASIS OF SHARED DOCUMENT, DEVICE AND APPARATUS THEREFOR, AND STORAGE MEDIUM

CROSS REFERENCE TO RELATED APPLICATIONS

The present disclosure is a continuation of U.S. patent application Ser. No. 17/017,581, filed on Sep. 10, 2020, which is a continuation of International Application No. PCT/CN2018/113509, filed on Nov. 1, 2018. The International Application claims the right of priority of Chinese Patent Application No. "201810718747.9", filed on Jun. 29, 2018. The disclosures of the aforementioned applications are herein incorporated by reference in their entireties.

TECHNICAL FIELD

The present disclosure relates to the field of Internet technologies, and in particular to a chat initiation method.

BACKGROUND

With continuous development of Internet communication technologies, Internet software has become an indispensable tool in a daily communication process of team members. An instant messaging (IM) chat tool can quickly establish a communication platform between individuals or teams by using a product platform, allowing users to communicate with each other online anytime anywhere, thereby greatly improving the efficiency of information transmission as well as the operating efficiency of a team.

Currently, the joining of a group chat or the invoking of a chat window is implemented by scanning a two-dimensional code via a mobile phone. However, for a personal computer (PC) end user, it is necessary to first scan a code by using a mobile phone and then perform operations at a PC end. Consequently, the existing technical solution is complex in operation and low in communication efficiency.

SUMMARY

The present disclosure solves technical problems in the related art to at least some extent.

According to an aspect of the present disclosure, a computer-implemented method is provided. The computer-implemented method comprises: determining a first user account that accesses a shared document; obtaining a first identifier of a chat group inserted into the shared document; displaying, according to a state of whether the first user account has joint into the chat group, a group chat control corresponding to the state in the shared document, wherein the group chat control is used for joining the chat group or for displaying an interface of the chat group; and sending, in response to an operation on the group chat control, a corresponding group chat request.

According to another aspect of the present disclosure, a computer-implemented method is provided. The computer-implemented method comprises: determining a first user account that accesses a shared document; displaying a list of chats that the first user account has joined into; and inserting, according to a chat selected by the first user account from the list, a first identifier of the chat into the shared document.

The additional aspects and advantages of the present disclosure will be partly presented in the following description, partly become apparent from the following description or be appreciated by practice of the present disclosure.

BRIEF DESCRIPTION OF THE DRAWINGS

To describe the technical solutions in embodiments of the present disclosure more clearly, one or more embodiments are illustratively described below by using their corresponding pictures in the drawings, and the illustrative descriptions do not constitute limitations on the embodiments, in which:

FIG. 2 is a schematic diagram of an effect of invoking a floating window in a web browser;

FIG. 3 is a schematic diagram of an effect of displaying a group chat control of "initiating a conversation" in the web browser;

FIG. 4 is a schematic diagram of an effect of displaying a group chat control of "joining a group chat" in the web browser;

DETAILED DESCRIPTION OF THE EMBODIMENTS

Figure 1:
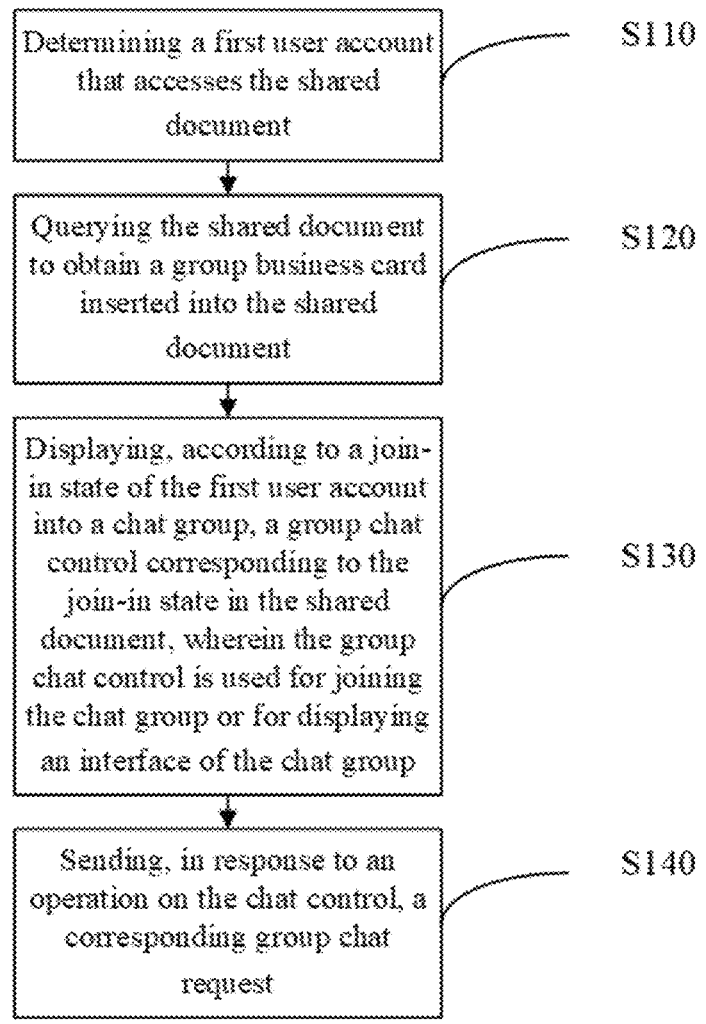
FIG. 1 is a flowchart of a group chat initiation method based on a shared document according to an embodiment of the present disclosure.

Embodiments of the present disclosure will be described below in detail, and examples of the embodiments are shown in the drawings, wherein the same or similar reference numerals throughout the drawings represent the same or similar elements or the elements having the same or similar functions. The embodiments described below with reference to the accompanying drawings are exemplary, and are intended to explain, but not be interpreted as limiting, the present disclosure.

The group chat initiation method and apparatus based on a shared document, and a device, and a storage medium in the embodiments of the present disclosure are described below with reference to the drawings.

It can be learned from the description of the prior art above that, the existing joining of a group chat or the invoking of a chat window is implemented by using a mobile phone to scan a two-dimensional code to join a certain group chat. However, for a PC end user, it is necessary to first scan a code by using a mobile phone and then perform operations at a PC end. Consequently, the existing technical solution is complex in operation and low in communication efficiency.

In the embodiments of the present disclosure, a shared document is queried to obtain a group business card inserted into the shared document, a corresponding group chat control is displayed according to a state of whether a first user account has joined into a chat group, referred to as a "join-in state," and a corresponding group chat request is sent in response to an operation of a user on the group chat control.

In some embodiments, FIG. 1 is a flowchart of a group chat initiation method based on a shared document according to an embodiment of the present disclosure. The method provided in this embodiment may be performed by a browser, or may be performed by other application programs that are used for accessing the shared document. The application program that performs the method provided in this embodiment may be run on a PC end. A person skilled in the art can know that the PC end is only a possible implementation. The application program is also applicable to other electronic devices, such as: a mobile electronic device such as a mobile phone, a smart phone, a notebook computer, a digital broadcast receiver, a personal digital assistant (PDA), a PAD (tablet), a portable multimedia player (PMP), a navigation apparatus, a vehicle-mounted electronic device, a vehicle-mounted display electronics, and a vehicle-mounted electronic rearview mirror, and a fixed electronic device such as a digital TV.

As shown in FIG. 1, the group chat initiation method based on a shared document includes the following acts.

S110, a first user account that accesses a shared document is determined.

In some embodiments, the shared document may be shared and edited by a plurality of user accounts, which are, for ease of distinguishing, marked as a first user account, a second user account, etc. A user to which the first user account belongs is an initiator of the current group chat, that is, a user who actively initiates the group chat. Generally, since there is a one-to-one correspondence between a user and a user account, the user account may be used to identify the user. In this act, the user identity can be, in some embodiments, recognized in the following several manners so as to determine an account that accesses the shared document, which is illustrated below by way of examples.

In example I, a user registration mechanism is implemented, in which an account and a login password of a user are stored in a server to distinguish and verify different users, such that when the user logs in at different terminals, identity recognition and message synchronization can be performed.

In example II, a biometric recognition technology is implemented, in which the biometric features, such as a fingerprint and an iris, of a user are stored in a server to distinguish and verify different users, such that when the user logs in at different terminals, identity recognition and message synchronization can be performed.

In example III, hardware information, such as a Media Access Control (MAC) address and a Bluetooth address, of a related device is read for identity recognition so as to distinguish different users, and once the user changes a login device, the user is considered as a new user. The information sent and received by the user through the present device is only stored in the present device, which makes it impossible to implement the message synchronization. Moreover, another user logging in at the present device is also considered as the user, and thus can access all the information sent and received on the present device.

S120, the shared document is queried to obtain a group business card inserted into the shared document.

In some embodiments, for a chat group that already exists, an identifier of the chat group is stored in the shared document in the form of a group business card, and the group business card inserted into the shared document is inserted by a second user account that accesses the shared document prior to the first user account. The process of inserting the group business card is described below by way of examples.

Figure 2:
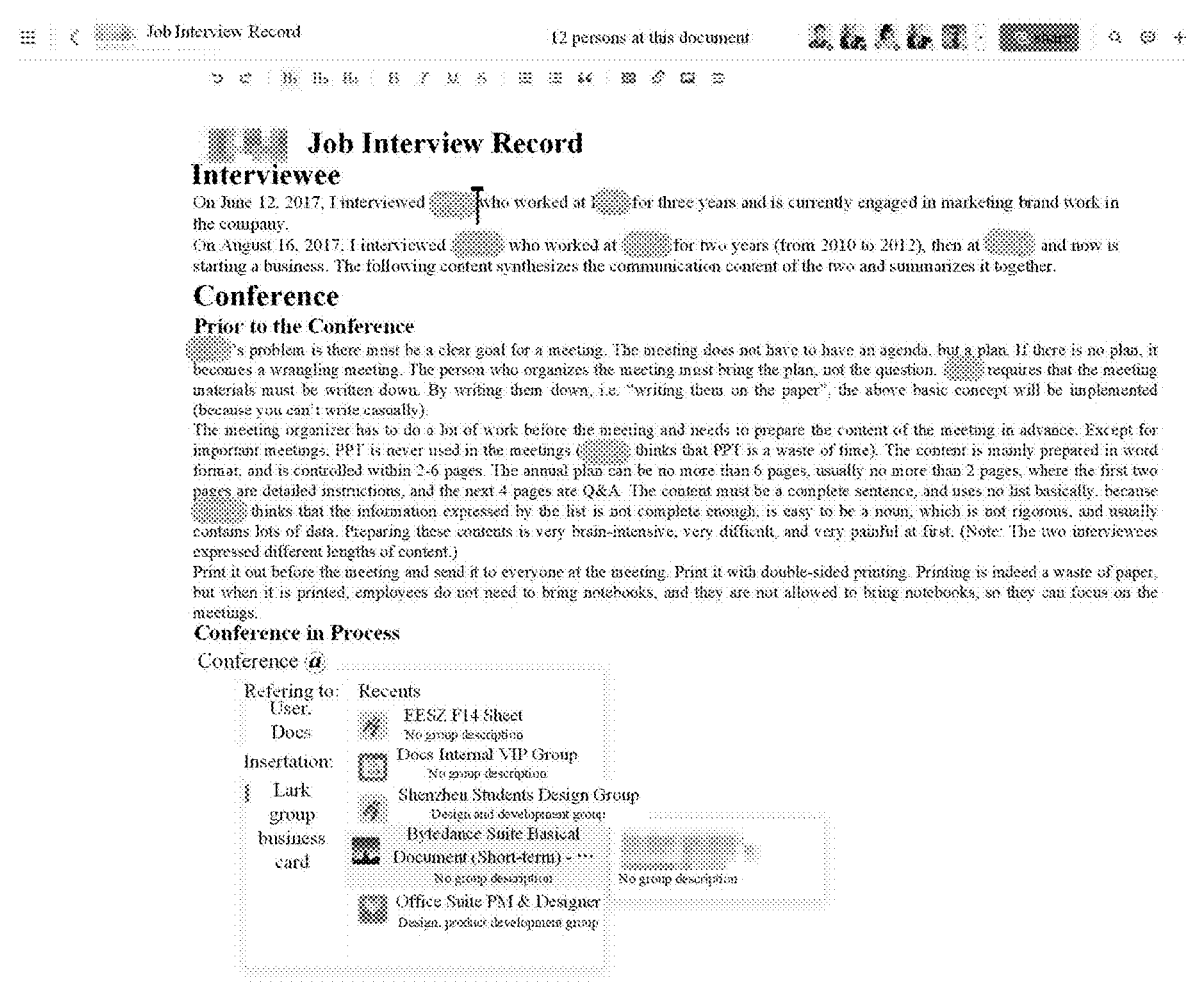

In a first example, as shown in FIG. 2, a Lark social application is used as an example for description. In a web browser, when an input character @ is read from a document, a floating window is invoked, and two functions of the symbol @ are displayed in the floating window for both referring to a user or a document and inserting a Lark group business card. A list of groups that recently participant in chatting are displayed in options expanded during the insertion of the Lark group business card.

In a second example, in a web browser, when an input character @ is read from a document, a floating window is invoked, and when a keyword contained in a group name continues to be read from the document, a list of groups is filtered, such that only a list of groups with the input keyword contained in a group name is displayed to help a user quickly search for a group name.

In a third example, in a web browser, when an input character @ is read from a document, a floating window is invoked, and when a keyword contained in a group name continues to be read from the document and none of all the group names contains the input keyword, content displayed in options expanded during the insertion of a Lark group business card will be empty.

S130, a group chat control, corresponding to a join-in state of the first user account into a chat group, is displayed in the shared document according to the join-in state.

Here the group chat control is used for joining the chat group or displaying an interface of the chat group.

In some embodiments, there are two types of group chat controls, that is, one is used for joining the chat group, and the other is used for displaying the interface of the chat group. One of the two types of group chat controls may be displayed based on the join-in state of the first user account into the chat group, which is described below by way of examples.

Figure 4:
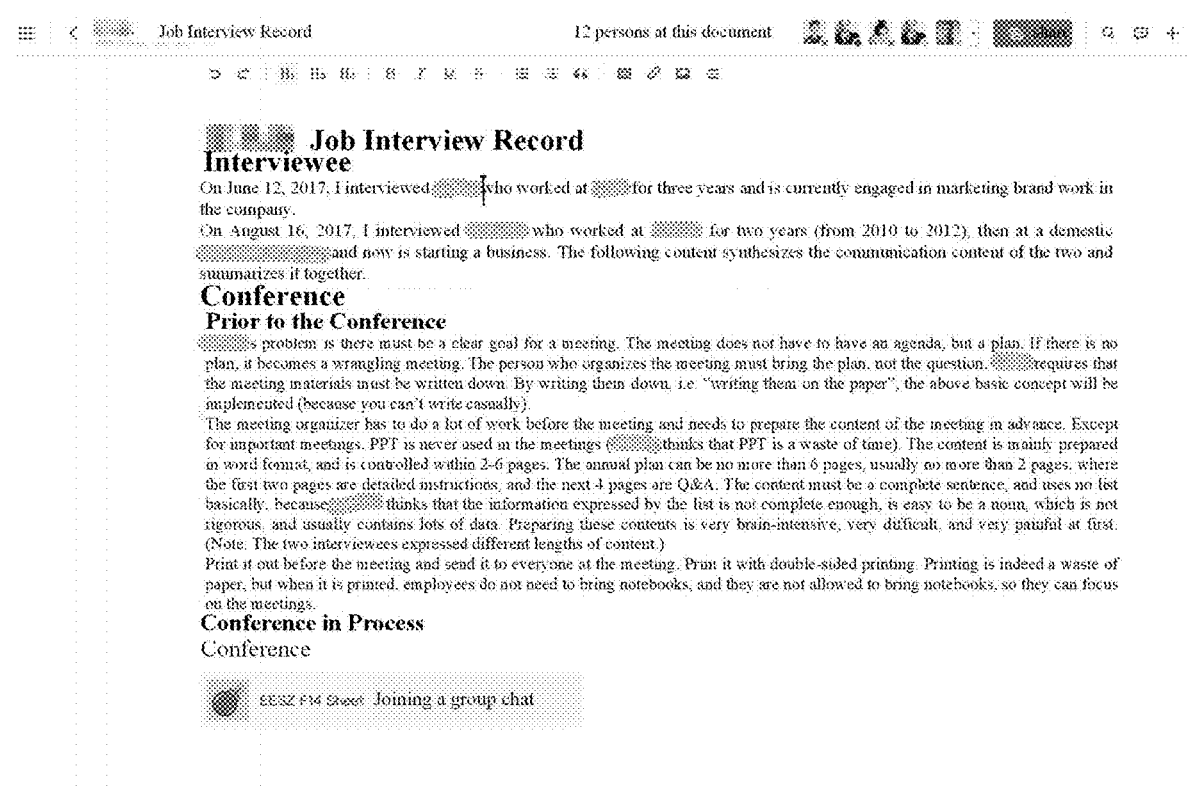

As shown in FIG. 3, if a user has joined into the chat group before, the content of the group chat control is displayed as "initiating a conversation". As shown in FIG. 4, if a user has not yet joined the chat group, the content of the group chat control is displayed as "joining a group chat".

S140, a corresponding group chat request is sent, in response to an operation on the group chat control.

It should be noted that different first user accounts correspond to different group chat controls, and the detected operations on the group chat controls are also different, which is described below by way of examples.

Figures 5, 6A:
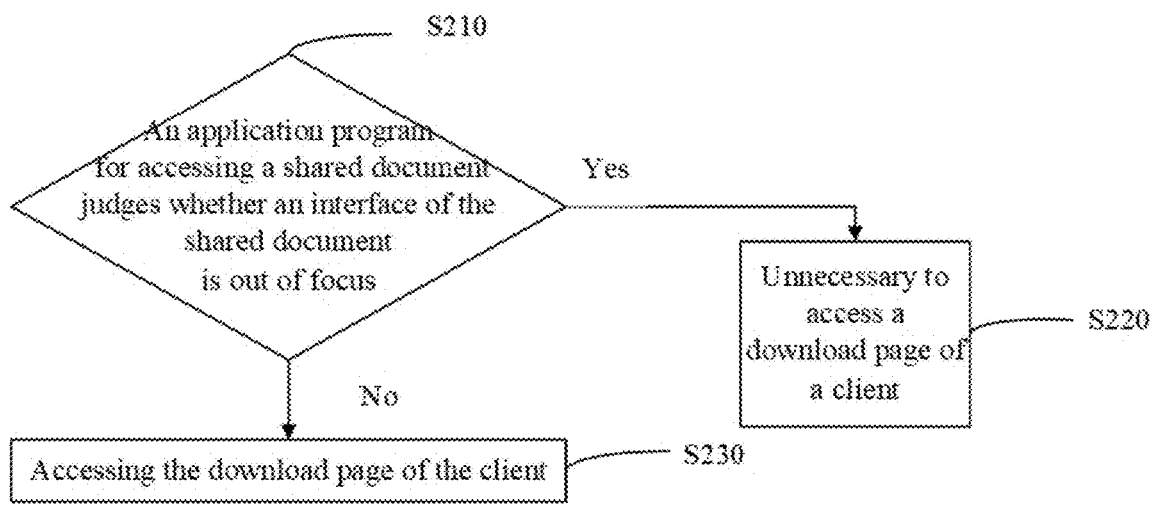
FIG. 5 is a schematic diagram of an effect of second-time confirmation of whether to join a group in the web browser.
FIG. 6A is a flowchart of a group chat initiation method based on a shared document according to another embodiment of the present disclosure.

In a first example, when it is detected that a user operates a group chat control for "joining a group chat" through the first user account, as shown in FIG. 5, the group chat control for "joining a group chat" will jump to a new group chat control for second-time confirmation of whether to join a group, and after an operation of second-time confirmation performed by the user is detected, a front end transmits a userId (User Id) of the first user account and a chatId (Chat Id) of the group chat to a back-end, and the back-end associates the userId with the chatId to complete a group joining operation of the first user account.

The userId of the first user account is an identifier of the account in this account system, and information of the first user account may be determined by means of the userId. The chatId of the group chat is an identifier of the chat group in the Lark social application, and information of the chat group may be determined by means of the chatId.

In a second example, when it is detected that the user operates the group chat control for "initiating a conversation" through the first user account, a chat conversation window of the group is directly displayed.

In summary, the group chat initiation method based on a shared document in an embodiment of the present disclosure includes: determining a first user account that accesses a shared document; querying the shared document to obtain a group business card inserted into the shared document; displaying, according to a join-in state of the first user account into a chat group, a group chat control corresponding to the join-in state in the shared document; and sending, in response to an operation on the group chat control, a corresponding group chat request. Thus, by querying the shared document, and sending, according to the join-in state of the first user account into the chat group, the corresponding group chat request in response to the operation on the group chat control, the technical problem of complex operations of scanning a code using a mobile phone in the prior art is solved.

Based on the description of the above embodiments, it can be learned how an application program for accessing a shared document initiates a group chat based on a group business card inserted into the shared document, and to make the group chat initiation method based on a shared document in the embodiments of the present disclosure clearer to a person skilled in the art, the process of how a client or a server of a social application, in some embodiments, executes a group chat is described below.

In a possible scenario, based on the method flow shown in FIG. 1, if it is detected in act S140 that the first user account operates a group chat control for "initiating a conversation", then a group chat request of "initiating a conversation" is sent to a client, wherein the group chat request carries the identifier chatId of the chat group, such that the client can switch the interface of the corresponding chat group to a foreground display state.

FIG. 6A is a flowchart of a group chat initiation method based on a shared document according to another embodiment of the present disclosure. As shown in FIG. 6A, based on the method flow shown in FIG. 1, after the group chat request is sent to a client of a social application in act S140, the group chat initiation method further includes the acts as follows.

S210, an application program for accessing the shared document judges whether an interface of the shared document is out of focus, and if the interface of the shared document is out of focus, act S220 is executed, otherwise act S230 is executed.

It is judged whether a download page of a client is to be accessed by judging whether the interface of the shared document is out of focus. The reason is as follows: if the interface of the shared document is out of focus, it indicates that the client successfully switches the interface of the chat group to a foreground display state; and if the interface of the shared document is not out of focus, it indicates that the client does not switch the interface of the chat group to the foreground display state, and there may be a case in which the client is not installed on the present device, which makes it necessary to remind the user to which the first user account belongs to download and install the client on the present device.

S220, it is not necessary to access the download page of the client.

In some embodiments, the client switches the interface of the chat group to the foreground display state according to the identifier chatId of the chat group that is carried in the group chat request sent by the application program for the shared document.

S230, the download page of the client is accessed.

In some embodiments, the application program that accesses the shared document automatically accesses the download page of the client, and displays a download link of the client to the user to which the first user account belongs. At this time, the user may choose whether to download and install the client. If the user drops out of downloading and installing the client, the group chat cannot be initiated; and if the user chooses to download and install the client, then after the client is downloaded and installed, the interface of the chat group is switched to the foreground display state according to the identifier chatId of the chat group that is carried in the group chat request sent by the application program for the shared document.

Therefore, it is judged whether a user needs to download and install the client by judging whether the interface of the shared document is out of focus, and a download link is provided for the user that needs to download and install the client, such that the operation processes of the user are reduced, and the working efficiency is improved.

In another possible application scenario, based on the method flow shown in FIG. 1, if it is detected in act S140 that the first user account operates a group chat control for "joining a group chat", and that the operation of second-time confirmation is detected, then a group chat request of "joining a group chat" is sent to a server, wherein the group chat request carries the identifier chatId of the chat group and the identifier userId of the first user account, such that the server instructs, after adding the first user account into the chat group, a client to display a notification message of the joining of the group chat and/or to switch the interface of the chat group to the foreground display state.

Figure 6B:
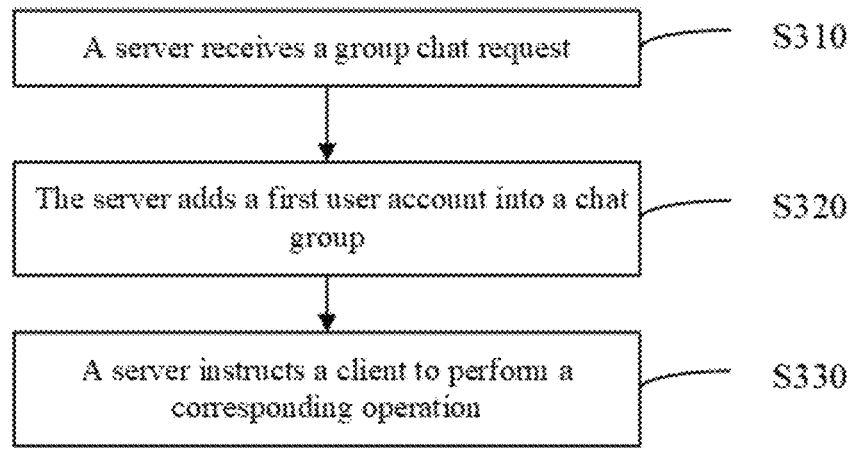
FIG. 6B is a flowchart of a group chat initiation method based on a shared document according to still another embodiment of the present disclosure.

FIG. 6B is a flowchart of a group chat initiation method based on a shared document according to still another embodiment of the present disclosure. As shown in FIG. 6B, based on the method flow shown in FIG. 1, after the group chat request is sent to a server of a social application in act S140, the group chat initiation method further includes the acts as follows.

S310, the server receives the group chat request.

In some embodiments, the server receives the group chat request sent by the application program that accesses the shared document, and obtains the identifier chatId of the chat group and the identifier userId of the first user account therefrom.

S320, the server adds the first user account into the chat group.

In some embodiments, the server adds data information of the first user account into an information library of members in the chat group.

S330, the server instructs a client to perform a corresponding operation.

In some embodiments, the server instructs the client to display notification information indicating the joining of a group chat and/or to switch the interface of the chat group to the foreground display state.

Therefore, an application program that accesses the shared document sends the group chat request to the server of the social application, the first user account is added into the group chat in the social application, and the interface of the chat group is displayed at a front end, such that the operations of a user joining a group are reduced, and the working efficiency is improved.

Based on the description of the above embodiments, it can be learned how to initiate a group chat based on a group business card inserted into the shared document. To make the group chat initiation method based on a shared document in the embodiments of the present disclosure clearer to a person skilled in the art, it will be explained how to insert a group business card into the shared document, which is described in detail below in conjunction with FIG. 7.

Figure 7:
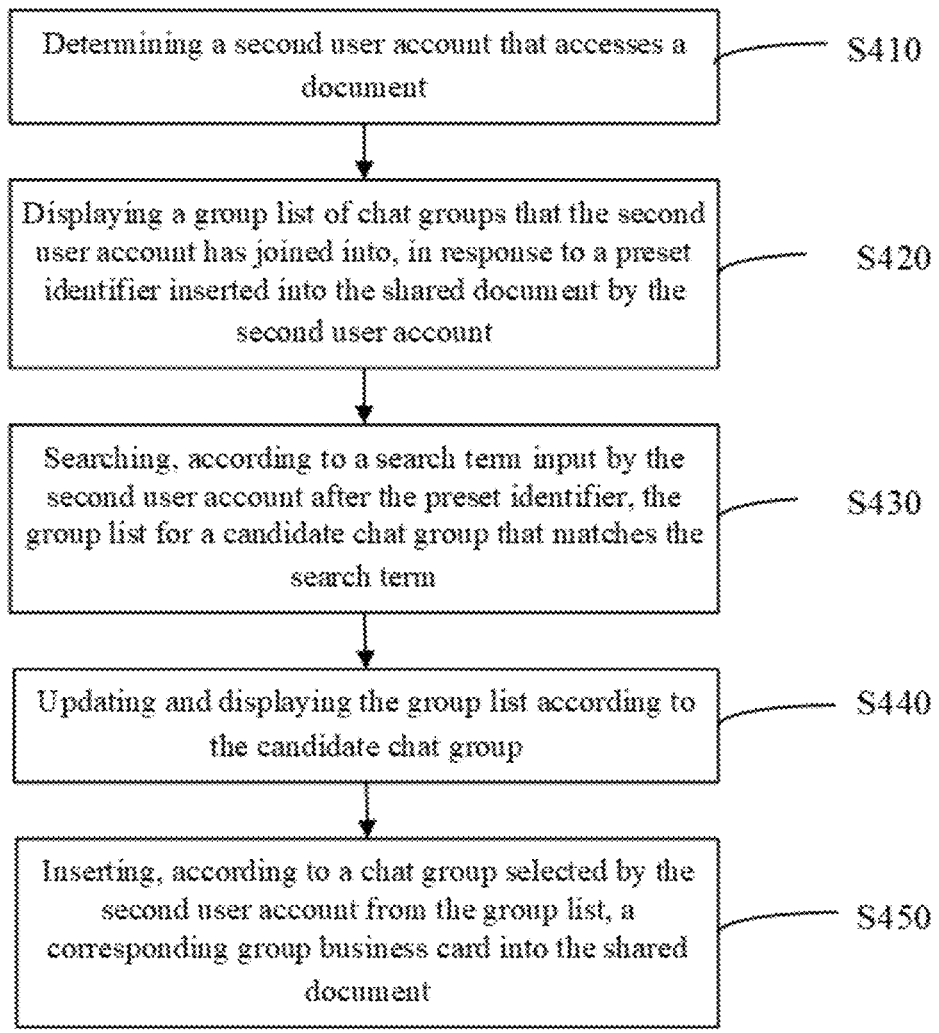
FIG. 7 is a flowchart of a group chat initiation method based on a shared document according to yet another embodiment of the present disclosure.

FIG. 7 is a flowchart of a group chat initiation method based on a shared document according to yet another embodiment of the present disclosure. As shown in FIG. 7, based on the method flow shown in FIG. 1, before S110, the group chat initiation method further includes the acts as follows.

S410, a second user account that accesses a document is determined.

S420, a group list of chat groups that the second user account has joined into is displayed in response to a preset identifier inserted into the shared document by the second user account.

In some embodiments, the preset identifier inserted by the second user account may be a special symbol such as @, #, $, &, and *, but should not be the same as some symbols with special functions in the shared document.

It should be noted that there may be many group chats that the second user account has joined into, and to facilitate a user to which the second user account belongs in quickly finding the group to which the user wants to join the shared document, a group in which a group chat record is recently generated is preferentially displayed, or a frequently used group may be manually preset for preferential display.

S430, according to a search term input by the second user account after the preset identifier, a candidate chat group that matches the search term is searched for in the group list.

S440, the group list is updated and displayed according to the candidate chat group of the second user account.

In some embodiments, the second user account filters and screens the group list by inputting the search term after the preset identifier, so as to screen out a chat group that matches the search term as the candidate chat group and filter out the other chat groups, and then updates the original group list with the candidate chat group, such that the group list displays only the name of the chat group that matches the search term.

S450, according to a chat group selected by the second user account from the group list, a corresponding group business card is inserted into the shared document.

It should be noted that, in the same account system, a user may send, to the other users, a group chat that the user has joined into, so as to invite the other users to join the group chat. For ease of description, it is described in the context of the second user account modifying content of the shared document and inviting the first user account to join a group chat.

In some embodiments, a group list of chat groups that the second user account has joined into is displayed in response to a preset identifier inserted into the shared document by the second user account, the candidate chat group is matched according to the search term input by the second user account after the preset identifier, the group list is updated, and the corresponding group business card is inserted into the shared document according to the chat group selected by the second user account. At this time, the first user account accesses the modified shared document, the modified shared document is queried to obtain the group business card inserted into the document, a corresponding group chat control is displayed according to a join-in state of the first user account into the chat group, and a corresponding group chat request is sent in response to an operation of the first user account on the group chat control. It is described below by way of examples.

A second account user wishes to invite a first account user to join a chat group that the second account user has joined into but is not in a shared document. The first account user cannot send a group chat request by querying the shared document to find an inserted group business card and then operating a group chat control. The second account user can insert a preset identifier into the shared document to acquire a list of group chats that the second account user has joined into, and screen out and select the chat group by using a search term so that a group business card of the group can be inserted into the shared document. At this time, the first account user can find, by means of querying, the group business card of the group in the shared document, and operate a corresponding group chat control.

Therefore, users can share information of a chat group by inserting a group business card into a shared document, which facilitates the sharing of group information and simplifies the acts of joining a group chat.

Figure 8:
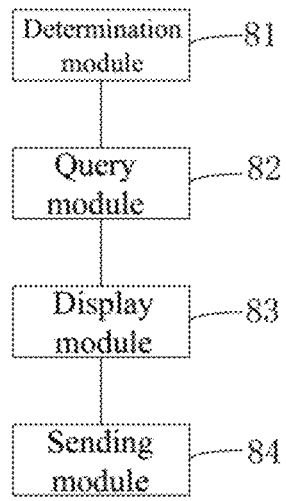
FIG. 8 is a schematic structural diagram of a group chat initiation apparatus based on a shared document provided in an embodiment of the present disclosure.

To implement the above embodiments, the present disclosure further provides a group chat initiation apparatus based on a shared document. FIG. 8 is a schematic structural diagram of a group chat initiation apparatus based on a shared document provided in the embodiment of the present disclosure. As shown in FIG. 8, the group chat initiation apparatus based on a shared document includes: a determination module 81, a query module 82, a display module 83, and a sending module 84.

The determination module 81 is configured to determine a first user account that accesses a shared document.

The query module 82 is configured to query the shared document to obtain a group business card inserted into the shared document.

The display module 83 is configured to display, according to a join-in state of the first user account into a chat group, a group chat control corresponding to the join-in state in the shared document.

The sending module 84 is configured to send, in response to an operation on the group chat control, a corresponding group chat request.

It should be noted that the above explanations and descriptions of the embodiments of the group chat initiation method based on a shared document are also applicable to the group chat initiation apparatus based on a shared document in this embodiment, which will not be described herein again.

In the group chat initiation apparatus based on a shared document in the embodiment of the present disclosure, the determination module is configured to determine a first user account that accesses a shared document; the query module is configured to query the shared document to obtain a group business card inserted into the shared document; the display module is configured to display a corresponding group chat control according to a join-in state of the first user account into a chat group; and the sending module is configured to send a corresponding chat request in response to an operation on the group chat control. By querying the shared document, and sending, according to the join-in state of the first user account into the chat group, the corresponding group chat request in response to the operation on the group chat control, the technical problem of complex operations of scanning a code using a mobile phone in the prior art is solved.

Figure 9A:
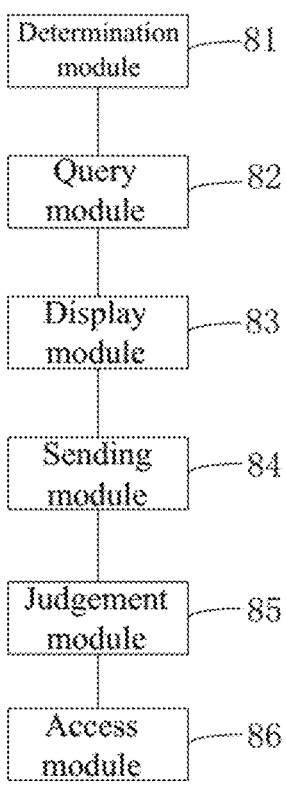
FIG. 9A is another schematic structural diagram of the group chat initiation apparatus based on the shared document provided in the embodiment of the present disclosure.

Based on the above embodiments, the embodiments of the present disclosure further provide a possible implementation of a group chat initiation apparatus based on a shared document. FIG. 9A is another schematic structural diagram of the group chat initiation apparatus based on a shared document provided in the embodiment of the present disclosure. On the basis of the previous embodiment, as shown in FIG. 9A, the apparatus further includes: a judgement module 85 and an access module 86.

As a possible implementation of this embodiment, the sending module 84 may be, in some embodiments, configured to: send, to a client of a social application, a chat request, which carries an identifier of a chat group.

The judgement module 85 is configured to judge whether an interface of a shared document is out of focus.

The access module 86 is configured to access a download interface of the client.

It should be noted that the above explanations and descriptions of the embodiments of the group chat initiation method based on a shared document are also applicable to the group chat initiation apparatus based on a shared document in this embodiment, which will not be described herein again.

In the group chat initiation apparatus based on a shared document in this embodiment of the present disclosure, it is judged whether a user needs to download and install the client by judging whether the interface of the shared document is out of focus, and a download link is provided for the user that needs to download and install the client, such that the operation processes of the user are reduced, and the working efficiency is improved.

Figure 9B:
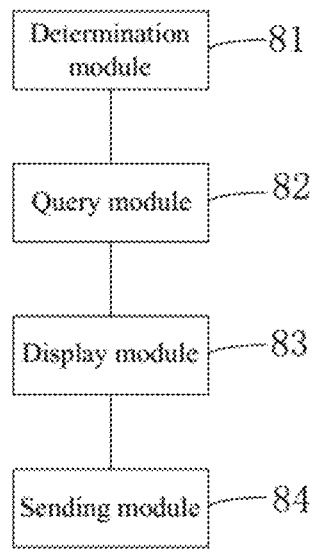
FIG. 9B is still another schematic structural diagram of the group chat initiation apparatus based on the shared document provided in the embodiment of the present disclosure.

Based on the above embodiments, the embodiments of the present disclosure further provide a possible implementation of the group chat initiation apparatus based on a shared document. FIG. 9B is still another schematic structural diagram of the group chat initiation apparatus based on a shared document provided in the embodiment of the present disclosure. The group chat initiation apparatus based on a shared document includes: a determination module 81, a query module 82, a display module 83, and a sending module 84.

As a possible implementation of this embodiment, the sending module 84 may be configured to: send, to a server of a social application, a chat request, which carries an identifier of a chat group and an identifier of a first user account.

It should be noted that the above explanations and descriptions of the embodiments of the group chat initiation method based on a shared document are also applicable to the group chat initiation apparatus based on a shared document in this embodiment, which will not be described herein again.

In the group chat initiation apparatus based on a shared document in this embodiment of the present disclosure, an application program that accesses the shared document sends the group chat request to the server of the social application, the first user account is added into the group chat in the social application, and the interface of the chat group is displayed at a front end, such that the operations of a user joining a group are reduced, and the working efficiency is improved.

Figure 10:
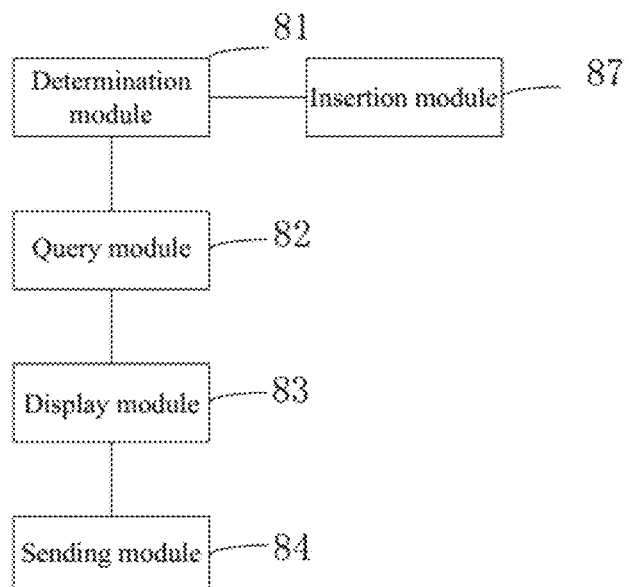
FIG. 10 is yet another schematic structural diagram of the group chat initiation apparatus based on the shared document provided in the embodiment of the present disclosure.

Based on the above embodiments, the embodiments of the present disclosure further provide a possible implementation of a group chat initiation apparatus based on a shared document. FIG. 10 is yet another schematic structural diagram of the group chat initiation apparatus based on a shared document provided in the embodiment of the present disclosure. On the basis of the previous embodiment, as shown in FIG. 10, the apparatus further includes: an insertion module 87.

As a possible implementation of this embodiment, the determination module 81 may be further configured to: determine a second user account that accesses the shared document.

The insertion module 87 is configured to insert, into the shared document, a chat group that the second user account has joined into, by the following acts: displaying a group list of chat groups that the second user account has joined into, in response to a preset identifier inserted into the shared document by the second user account; searching, according to a search term input by the second user account after the preset identifier, the group list for a candidate chat group that matches the search term; updating and displaying the group list according to the candidate chat group of the second user account; and inserting, according to a chat group selected by the second user account from the group list, a corresponding group business card into the shared document.

It should be noted that the above explanations and descriptions of the method embodiments are also applicable to the apparatus in this embodiment, which will not be described herein again.

In the group chat initiation apparatus based on a shared document in this embodiment of the present disclosure, the group business card is inserted into the shared document through the second user account, and the shard document is queried through the first user account, such that users can share information of a chat group by inserting the group business card into the shared document, which facilitates the sharing of group information and simplifies the acts of joining a group chat.

To implement the above embodiments, the embodiments of the present disclosure further provide a non-transitory storage medium having a computer program stored thereon, wherein when the program is executed by a processor, the group chat initiation method based on a shared document as described in the above method embodiments is implemented.

Figure 11:
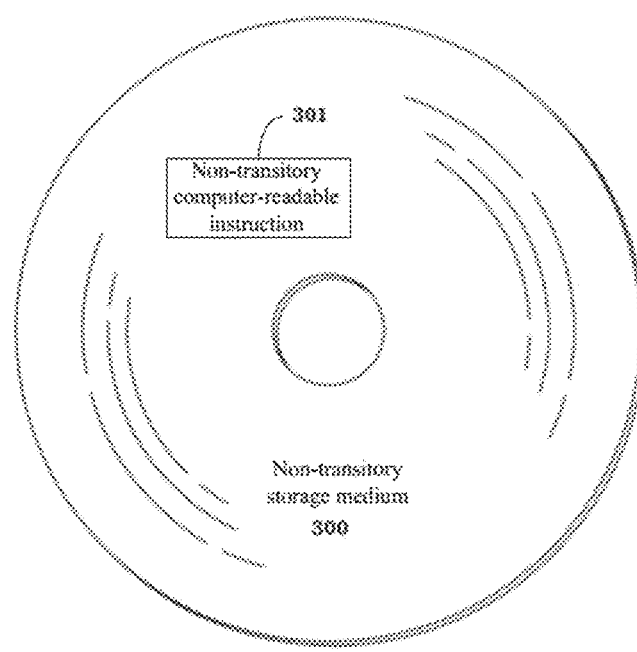
FIG. 11 is a schematic diagram illustrating a non-transitory storage medium according to an embodiment of the present disclosure.

FIG. 11 is a schematic diagram illustrating a non-transitory storage medium according to an embodiment of the present disclosure. As shown in FIG. 11, the non-transitory storage medium 300 according to the embodiment of the present disclosure have non-transitory computer-readable instructions 301 stored thereon. When the non-transitory computer-readable instructions 301 are executed by a processor, all or some of acts of the group chat initiation method based on a shared document as described in the above embodiments of the present disclosure are performed.

To implement the above embodiments, the embodiments of the present disclosure further provide an electronic device, including: a memory, a processor, and a computer program that is stored in the memory and can be run on the processor, wherein the processor implements, when executing the program, the group chat initiation method based on a shared document as described in the above method embodiments.

Figure 12:
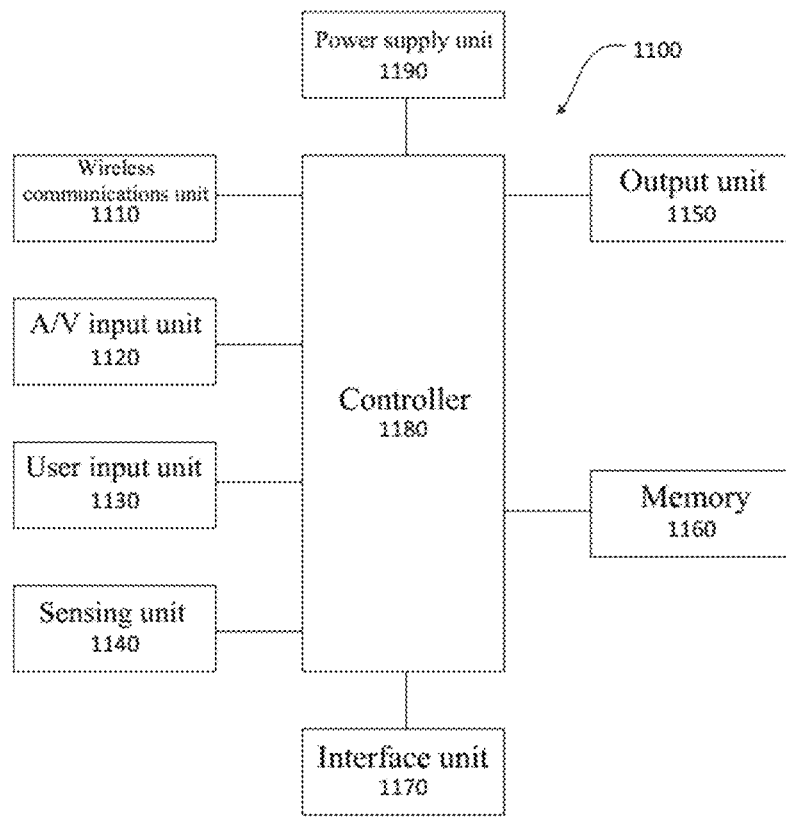
FIG. 12 is a schematic hardware structural diagram of an electronic device according to an embodiment of the present disclosure.

FIG. 12 is a schematic hardware structural diagram of an electronic device according to an embodiment of the present disclosure. The electronic device may be implemented in various forms, and the electronic device in the present disclosure may include but is not limited to a mobile electronic device such as a mobile phone, a smart phone, a notebook computer, a digital broadcast receiver, a personal digital assistant (PDA), a PAD (tablet), a portable multimedia player (PMP), a navigation apparatus, a vehicle-mounted electronic device, a vehicle-mounted display electronics, and a vehicle-mounted electronic rearview mirror, and a fixed electronic device such as a digital TV and a desktop computer.

As shown in FIG. 12, an electronic device 1100 may include a wireless communications unit 1110, an A/V (audio/video) input unit 1120, a user input unit 1130, a sensing unit 1140, an output unit 1150, a memory 1160, an interface unit 1170, a controller 1180, a power supply unit 1190, etc. FIG. 12 shows the electronic device having various components. However, it should be understood that not all the illustrated components are required to be implemented. Alternatively, more or fewer components can be implemented.

The wireless communications unit 1110 allows radio communication between the electronic device 1100 and a wireless communication system or a network. The A/V input unit 1120 is used for receiving an audio or video signal. The user input unit 1130 can generate key input data according to a command input by a user, so as to control various operations of the electronic device. The sensing unit 1140 detects a current state of the electronic device 1100, the position of the electronic device 1100, whether there is touch input of a user on the electronic device 1100 or not, an orientation of the electronic device 1100, acceleration or deceleration movement and direction of the electronic device 1100, etc., and generates a command or signal for controlling an operation of the electronic device 1100. The interface unit 1170 is used as an interface through which at least one external apparatus is connected to the electronic device 1100. The output unit 1150 is configured to provide an output signal in a visual, audible, and/or tactile manner. The memory 1160 may store a software program that is executed by the controller 1180 for processing and controlling an operation, or may temporarily store data that has been output or is to be output. The memory 1160 may include at least one type of storage medium. Moreover, the electronic device 1100 may cooperate with a network storage apparatus that executes a storage function of the memory 1160 through a network connection. The controller 1180 generally controls overall operations of the electronic device. In addition, the controller 1180 may include a multimedia module for reproducing or playing back multimedia data. The controller 1180 can perform pattern recognition processing to recognize, as a character or an image, handwriting input or picture drawing input performed on a touch screen. The power supply unit 1190 receives external power or internal power under the control of the controller 1180, and provides appropriate power required to operate various elements and components.

Various implementations of the group chat initiation method based on a shared document provided in the present disclosure may be implemented in a computer-readable medium using, for example, computer software, hardware, or any combination thereof. For hardware implementation, various implementations of the group chat initiation method based on a shared document provided in the present disclosure may be implemented by using at least one of an application specific integrated circuit (ASIC), a digital signal processor (DSP), a digital signal processing device (DSPD), a programmable logic device (PLD), a field programmable gate array (FPGA), a processor, a controller, a microcontroller, a microprocessor, and an electronic unit designed to perform the functions described herein. In some cases, the various implementations of the group chat initiation method based on a shared document provided in the present disclosure may be implemented in the controller 1180. For software implementation, the various implementations of the group chat initiation method based on a shared document provided in the present disclosure may be implemented by a separate software module that is allowed to execute at least one function or operation. Software codes can be implemented by a software application program (or a program) written in any suitable programming language, and the software codes can be stored in the memory 1160 and executed by the controller 1180.

Through the description of the above embodiments, those skilled in the art can clearly understand that the embodiments can be implemented by software and necessary general hardware platforms. Of course, the embodiments can also be implemented in hardware. Based on such understanding, the above technical solutions substantially, or the part(s) thereof making contributions to the prior art, can be embodied in the form of a software product, and the computer software product can be stored in a non-transitory storage medium, such as a magnetic disk, an optical disk, a read-only memory (ROM) or a random access memory (RAM), which includes instructions to enable a computer device (which can be a personal computer, a server, or a network device, etc.) to execute the methods in embodiments or parts of the embodiments.

Finally, it should be noted that the above embodiments are only for describing, but not limiting, the technical solutions of the present disclosure. Although the present disclosure has been described in detail with reference to the above embodiments, those of ordinary skill in the art should understand that the technical solutions stated in the above embodiments can still be modified, or some of the technical features therein can be equivalently substituted; and such modifications or substitutions do not make the essence of the corresponding technical solutions depart from the spirit and scope of the technical solutions of respective embodiments of the present disclosure.

The invention claimed is:

1. A computer-implemented method, comprising:
    determining a first user account that accesses a shared document;
    obtaining a first identifier of a chat group inserted into the shared document;
    displaying, according to a state of whether the first user account has joined into the chat group, a group chat control corresponding to the state in the shared document, wherein the group chat control is used for joining the chat group or for displaying an interface of the chat group; and
    sending, in response to an operation on the group chat control, a corresponding group chat request.

2. The method according to claim 1, wherein the displayed group chat control is used for displaying the interface of the chat group, and sending, in response to the operation on the group chat control, the corresponding group chat request comprises:

sending the group chat request to a client of a social application, wherein the group chat request received by the client of the social application carries the first identifier of the chat group, such that the client of the social application switches the interface of the chat group to a foreground display state according to the first identifier of the chat group.

3. The method according to claim 2, wherein after sending the group chat request to the client of the social application, the method further comprises:

judging, based on whether an interface of the shared document is out of focus, whether a download page of the client is to be accessed.

4. The method according to claim 1, wherein the displayed group chat control is used for joining the chat group, and sending, in response to the operation on the group chat control, the corresponding group chat request comprises:

sending the group chat request to a server of a social application, wherein the group chat request received by the server carries the first identifier of the chat group and an identifier of the first user account, such that the server instructs, after adding the first user account into the chat group, a client of the social application to conduct at least one of displaying a notification message indicating joining of the chat group or switching the interface of the chat group to a foreground display state.

5. The method according to claim 1, wherein before obtaining the first identifier of the chat group inserted into the shared document, the method further comprises:

determining a second user account that accesses the shared document;

displaying a list of chat groups that the second user account has joined into, in response to a second identifier inserted into the shared document by the second user account; and inserting, according to a chat group selected by the second user account from the list, a corresponding chat group identifier into the shared document.

6. The method according to claim 5, wherein after displaying the list of chat groups that the second user account has joined into, the method further comprises:

searching, according to a search term input by the second user account after the second identifier, the list for a candidate chat group that matches the search term; and updating and displaying the list according to the candidate chat group.

7. The method according to claim 1, wherein before displaying, according to the state of whether the first user account has joined into the chat group, the group chat control corresponding to the state in the shared document, the method further comprises:

sending a query request to a server of a social application, wherein the query request is used by the server to query the state of whether the first user account has joined into the chat group and to generate a query response according to the state; and receiving the query response sent by the server, and determining the state of whether the first user account has joined into the chat group according to the query response.

8. A computer-implemented method, comprising:

determining a first user account that accesses a shared document;

displaying a list of chats that the first user account has joined into; and inserting, according to a chat selected by the first user account from the list, a first identifier of the chat into the shared document.

9. The method according to claim 8, wherein the displaying the list of chats that the first user account has joined into comprises:

displaying the list of chats that the first user account has joined into, in response to a second identifier inserted into the shared document by the first user account.

10. The method according to claim 9, wherein after the displaying the list of chats that the first user account has joined into, the method further comprises:

searching, according to a search term input by the first user account after the second identifier, the list for a candidate chat that matches the search term; and updating and displaying the list according to the candidate chat.

11. The method according to claim 8, further comprising:

determining a second user account that accesses the shared document;

displaying, according to a state of whether the second user account has joined into the chat, a chat control corresponding to the state in the shared document, wherein the chat control is used for joining the chat or for displaying an interface of the chat; and sending, in response to an operation on the chat control, a corresponding chat request.

12. The method according to claim 11, wherein the displayed chat control is used for displaying the interface of the chat, and sending, in response to the operation on the chat control, the corresponding chat request comprises:

sending the chat request to a client of a social application, wherein the chat request received by the client of the social application carries the first identifier of the chat, such that the client of the social application switches the interface of the chat to a foreground display state according to the first identifier of the chat.

13. The method according to claim 11, wherein the displayed chat control is used for joining the chat, and sending, in response to the operation on the chat control, the corresponding chat request comprises:

sending the chat request to a server of a social application, wherein the chat request received by the server carries the first identifier of the chat and an identifier of the second user account, such that the server instructs, after adding the second user account into the chat, a client of the social application to conduct at least one of displaying a notification message indicating joining of the chat or switching the interface of the chat to a foreground display state.

14. The method according to claim 11, wherein before displaying, according to the state of the second user account into the chat, the chat control corresponding to the state in the shared document, the method further comprises:

sending a query request to a server of a social application, wherein the query request is used by the server to query the state of the second user account into the chat and to generate a query response according to the state; and receiving the query response sent by the server, and determining the state according to the query response.

* * * * *